Jan. 1, 1957   R. P. LATHROP ET AL   2,775,886
OFFSET YIELD STRENGTH TESTING APPARATUS
Filed May 20, 1953   5 Sheets-Sheet 3
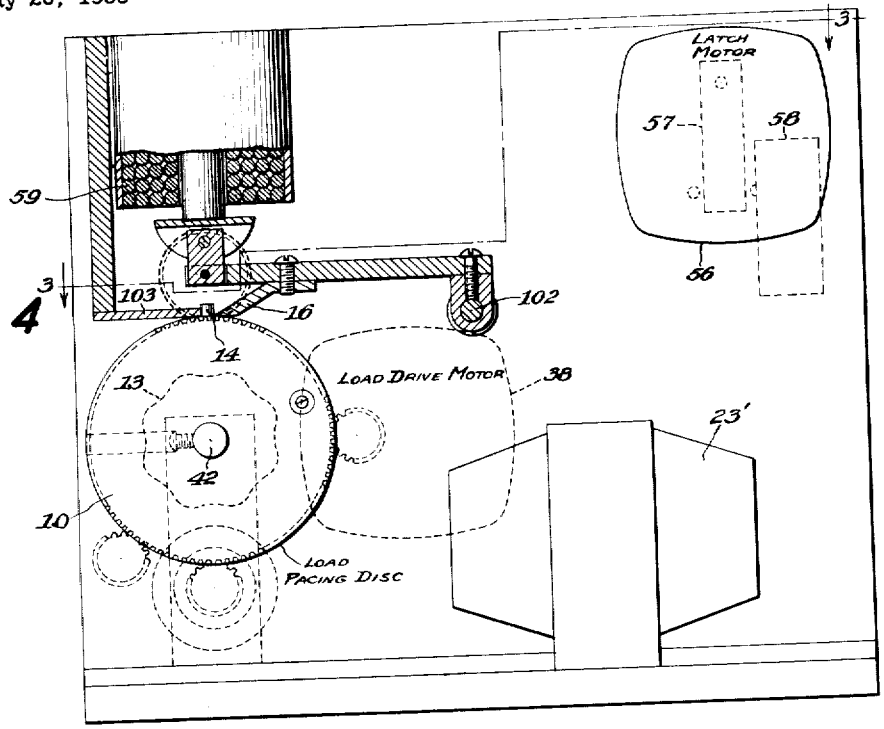
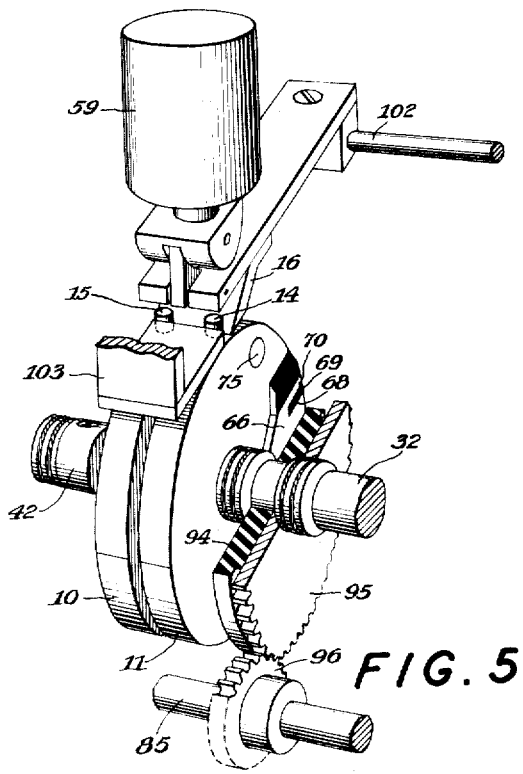
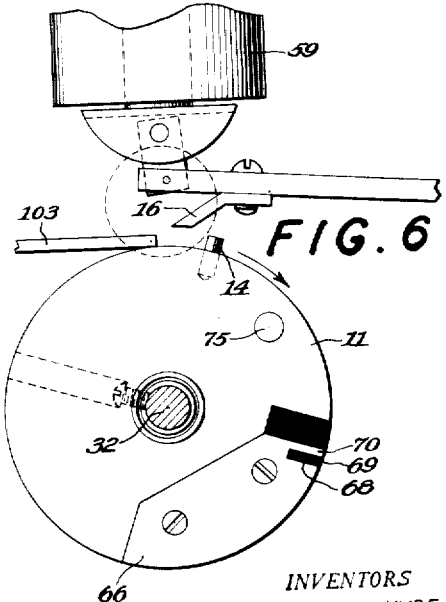
INVENTORS
LAWRENCE K. HYDE
ROBERT P. LATHROP
BY
ATTORNEY

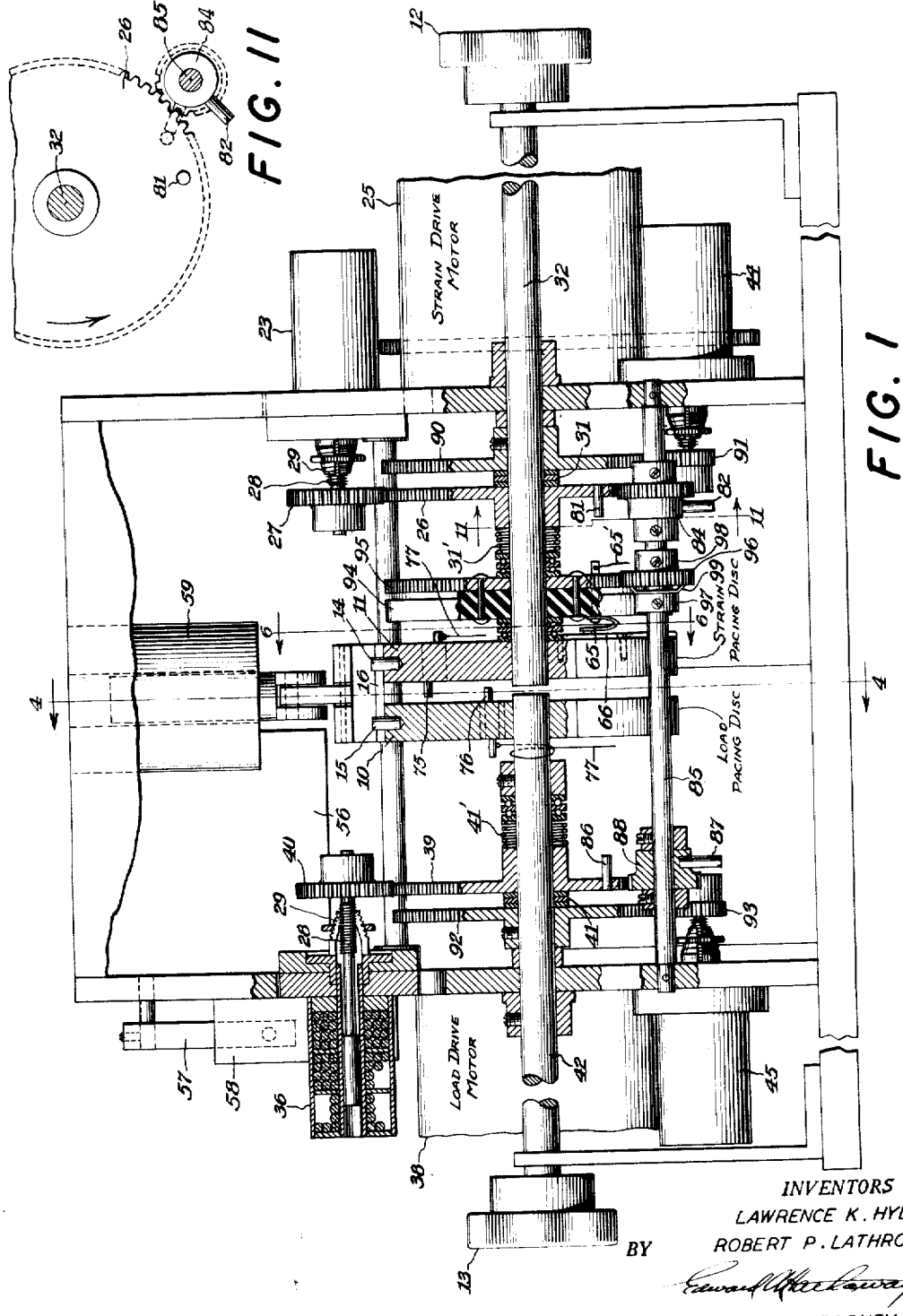

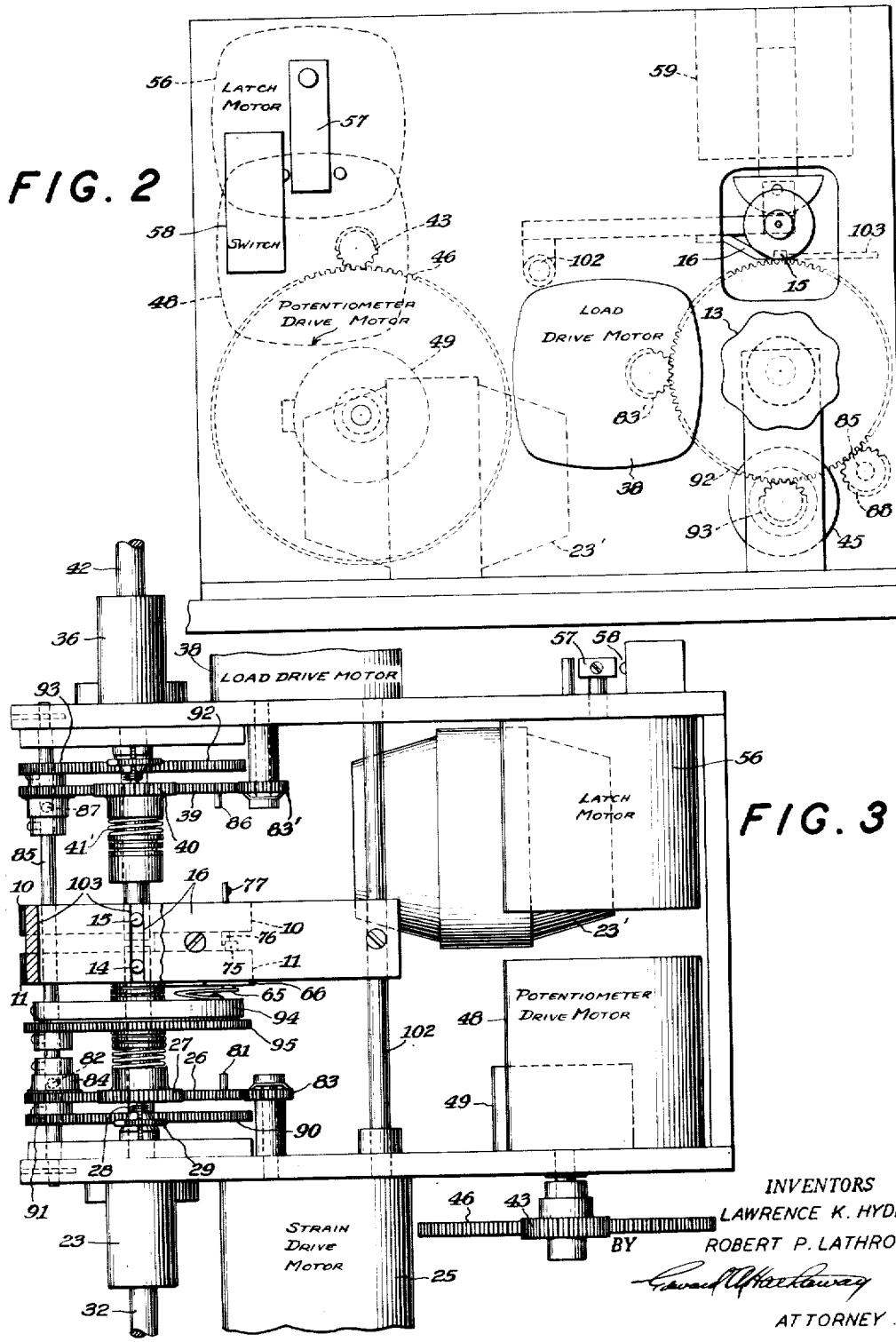
Jan. 1, 1957  R. P. LATHROP ET AL  2,775,886
OFFSET YIELD STRENGTH TESTING APPARATUS
Filed May 20, 1953  5 Sheets-Sheet 2
INVENTORS
LAWRENCE K. HYDE
ROBERT P. LATHROP
BY
ATTORNEY.

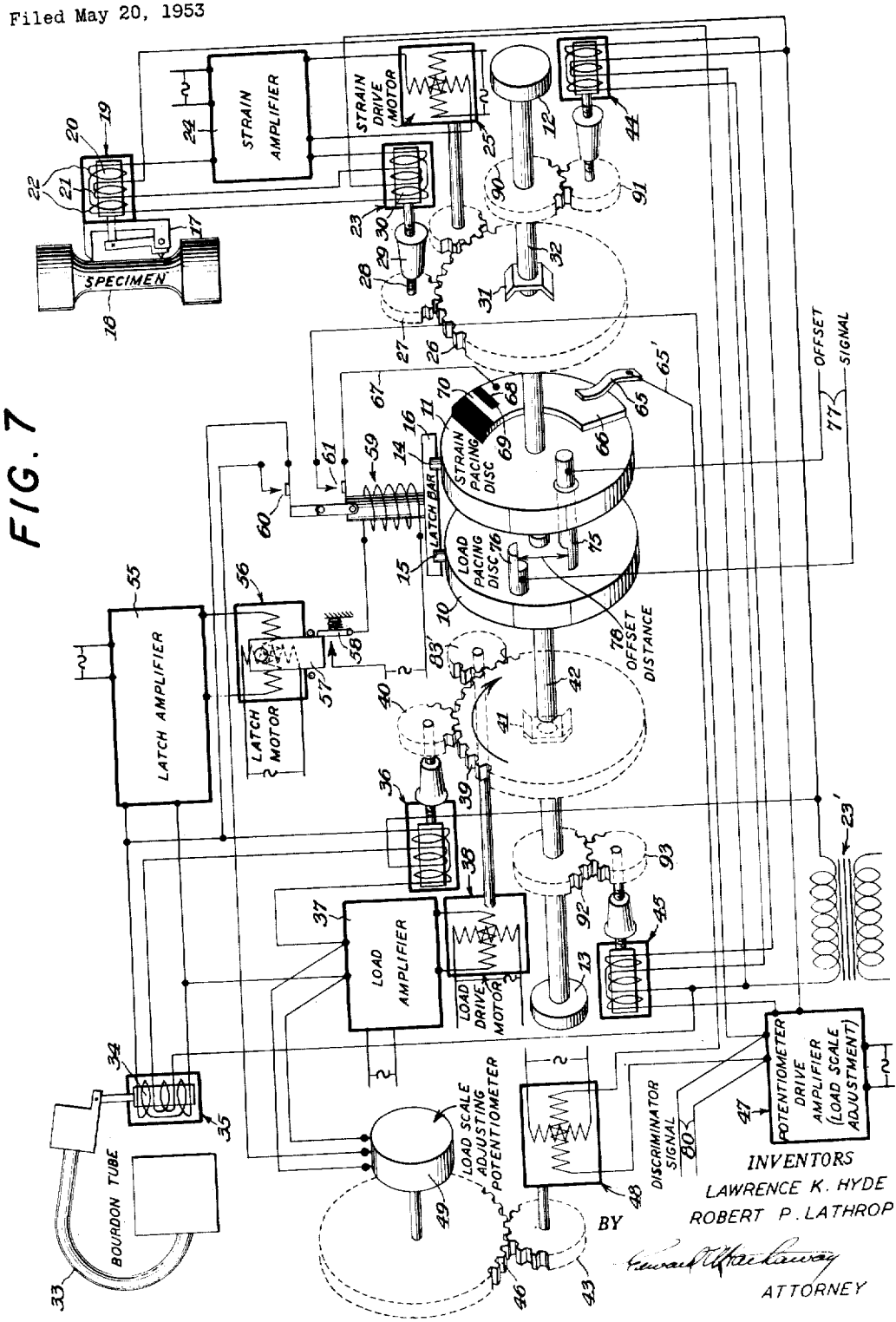

Jan. 1, 1957 R. P. LATHROP ET AL 2,775,886
OFFSET YIELD STRENGTH TESTING APPARATUS
Filed May 20, 1953 5 Sheets-Sheet 5
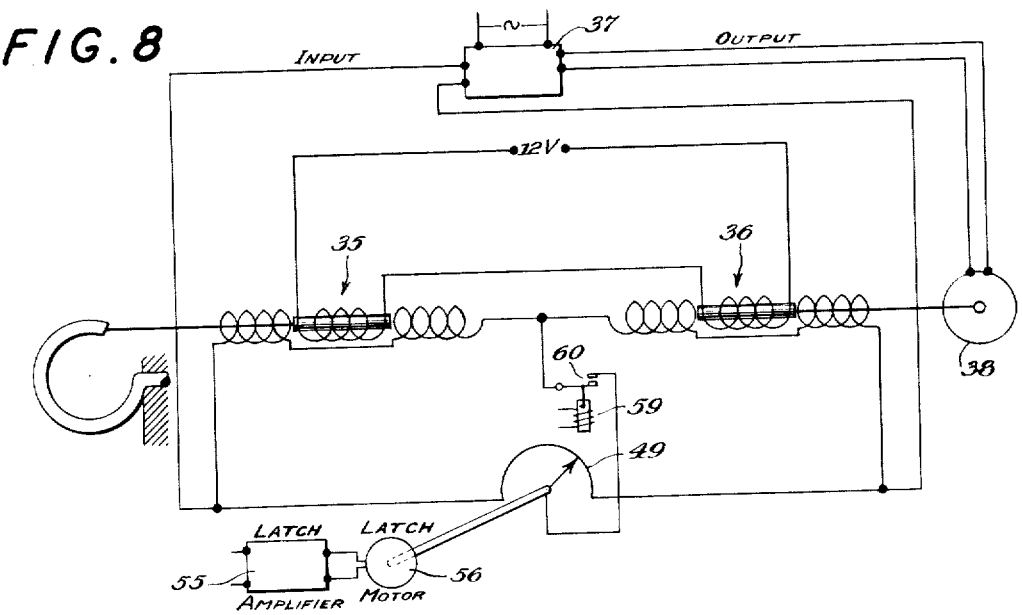
FIG. 8
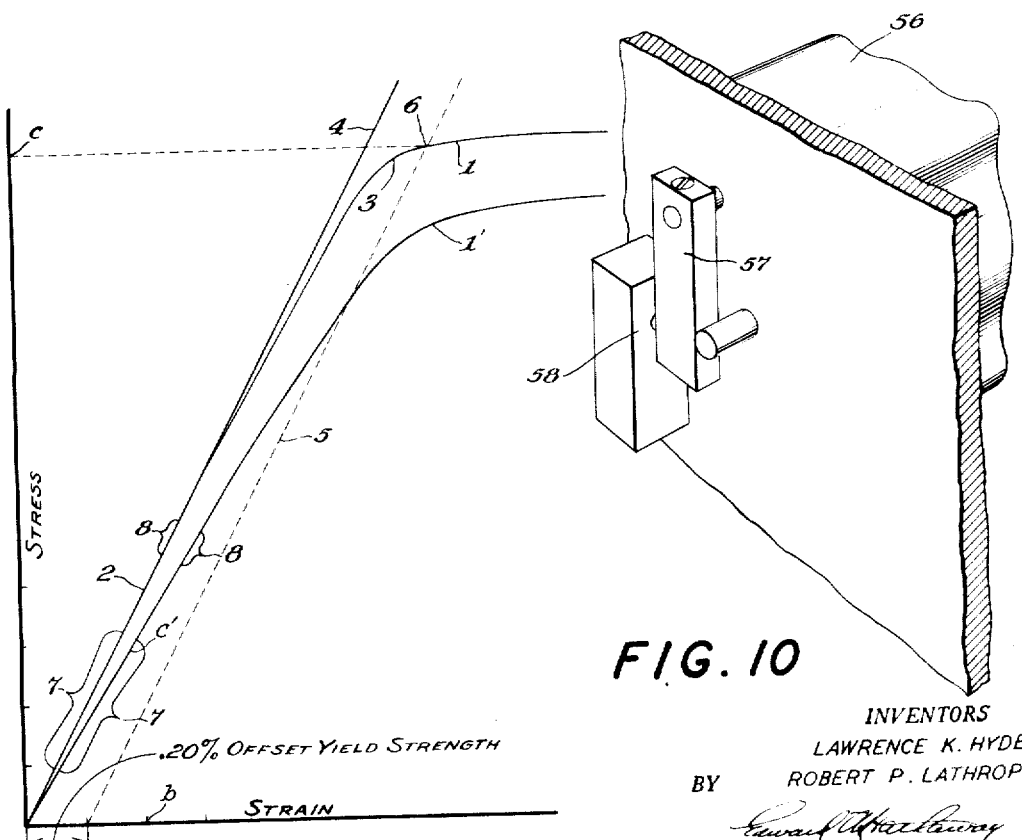
FIG. 9
FIG. 10
INVENTORS
LAWRENCE K. HYDE
ROBERT P. LATHROP
BY
ATTORNEY United States Patent Office 2,775,886
Patented Jan. 1, 1957

2,775,886

OFFSET YIELD STRENGTH TESTING APPARATUS

Robert P. Lathrop, Chevy Chase, Md., and Lawrence K. Hyde, Washington, D. C., assignors to Baldwin-Lima-Hamilton Corporation, a corporation of Pennsylvania Application May 20, 1953, Serial No. 356,282

25 Claims. (Cl. 73—88)

This invention relates to materials testing apparatus for determining the yield strength of materials by the offset method.

The yield strength is the stress at which a material exhibits an arbitrarily selected limiting permanent set. The offset method for determining yield strength consists, as is well known, in drawing a stress-strain diagram of a specimen and then drawing a line parallel to the usual linear elastic range of the diagram at a specified offset distance from such linear portion along the strain abscissa. The yield strength of the material is that stress which corresponds to the point of intersection of the offset line with the plastic portion of the stress-strain diagram. The amount of offset is arbitrarily selected either by the user of the material in accordance with the conditions under which the material is to be used or by agreement between the materials producer and the customer. The yield strength will thus be determined for each individual specimen tested and the percent of offset used will be specified. This percentage is expressed as the amount of strain (deformation) per inch of gage length.

Heretofore the offset yield strength was determined accurately only by manually laying out the offset method on a stress-strain diagram. Prior attempts to provide apparatus for automatically determining the offset yield strength have been grossly ineffective.

It is an object of our invention to provide improved apparatus for automatically determining offset yield strength with an accuracy that is fully comparable to the manual method.

Another object is to provide improved apparatus for determining offset yield strength by automatically producing the equivalent effect of drawing a stress-strain diagram, constructing a line parallel to the linear elastic portion of the diagram but offset from it by a predetermined amount, finding the intersection of the offset line with the stress-strain diagram and delivering a signal so that the specimen load can be determined at the instant when the intersection occurs.

A further object is to determine automatically the offset yield strength of a specimen, while under test, using apparatus that is relatively simple to operate and has a high degree of sensitivity, responsiveness and accurary combined with a high degree of dependability and stability of operation that is conducive to confidence in repetitive tests and results notwithstanding the multiplicity and complexity of functions automatically performed.

Other objects and advantages will be more apparent to those skilled in the art from the following description of the accompanying drawings in which:

Fig. 1 is a front elevation of our improved apparatus viewed from the right end of Fig. 2 partly broken away to show details of construction;

Fig. 2 is an end elevation viewed from the left end of Fig. 1;

Fig. 3 is a plan view of Fig. 2 on a smaller scale on line 3—3 of Fig. 4;

Fig. 4 is a transverse section taken substantially on the line 4—4 of Fig. 1;

Fig. 5 is a perspective of a load and strain pacing disk and solenoid control latching means therefor;

Fig. 6 is a fragmentary sectional view of the elements of Fig. 5 taken substantially on the line 6—6 of Fig. 1 and showing their operation just after release of the latch;

Fig. 7 is a diagrammatic electrical and mechanical diagram of part of our improved apparatus;

Fig. 8 is an electrical diagram of the load span adjusting system;

Fig. 9 is a diagram illustrating the method employed in determining offset yield strength;

Fig. 10 is a perspective of a switch operated by a latch motor viewed from the left end of Fig. 1; and Fig. 11 is a partial sectional view taken on the line 11—11 of Fig. 1.

To facilitate an understanding of the sequence of operations of our apparatus the manually executed offset method shown in Fig. 9 will be described. A stress-strain diagram 1 of a specimen of material is drawn starting from its usual zero position and extending up through the linear elastic portion 2 and thence into its plastic range 3. A so-called modulus line 4 is drawn linearly so as to coincide with the straight line elastic portion 2. Any desired degree of offset, for example 0.20 percent of strain is measured along the strain abscissa and a line 5 is drawn from that offset point parallel to the modulus line 4. The point of intersection 6 of line 5 with diagram 1 is the offset yield point which, when projected horizontally to the stress ordinate, determines the yield strength.

In one aspect of our invention two elements are rotatably driven respectively in response to load and strain so that a stress-strain diagram could be drawn from their angular displacements by considering the load values as if they were in terms of stress. Through the linear elastic range of a specimen the elements are arranged to rotate in a predetermined ratio of 1 to 1 and when passing into the plastic range to rotate relative to each other. Means are provided to produce a signal when a predtermined relative rotation occurs between the elements, this predetermined relative rotation constituting the percent of offset.

However, when specimens of different diameters having the same modulus of elasticity are tested, different load values would be required for producing a given strain, and, because a single mechanism for determining offset is used for these different specimens it is necessary to adjust the load scale for each such different specimen to convert load values into stress while at the same time maintaining a constant strain scale for all specimens whereby if stress-strain diagrams were actually plotted, they would all have the same slope for their modulus line. If a specimen having a different modulus of elasticity is tested the slope of its modulus line will be different but nevertheless our apparatus automatically adjusts itself so that the single mechanism for determining offset is equally effective for this different modulus.

In our invention a predetermined slope 4 for a given modulus is built into the apparatus as an inherent operating characteristic thereof. In testing different specimens it is then necessary to determine whether the stress scale is such that the slope of the elastic portion of the stress-strain diagram of the specimen material undergoing test coincides with this predetermined slope. This is done by testing the ratio of the stress scale to the strain scale over an arbitrarily selected region 7 of what would be the equivalent of a stress-strain diagram of that specimen, the region 7 preferably being a sufficient distance from the zero position of the stress-strain diagram so as to eliminate from consideration any preliminary or unnatural variations from a straight line that may occur during the initial portion of a test. If this ratio at any given instant in region 7 does not correspond to the slope of line 4 (as would be the case if the diagram were drawn to a scale so that the diagram would be, say, in position 1') the stress scale of diagram 1' is then changed automatically until its elastic portion coincides with line 4, it being understood that it is only necessary to change one or the other of the stress or strain scales, but not both, to orient the diagram toward or away from line 4. At a subsequent arbitrarily selected region 8 in the elastic range a check is made of the stress-strain scale ratio to see if it is still the same as in region 7 and thus insure that the slope of region 7 was not created by some false condition. Assuming that region 8 confirms the slope of region 7, the apparatus automatically continues its operation until point 6 is reached at which instant the offset signal is initiated to cause the operator either to read the load at that point on the testing machine load dial or to print or otherwise record the load.

The construction of the apparatus for accomplishing the foregoing results will be more readily understood by describing it in conjunction with its operation.

Load and strain components

While our apparatus does not actually draw a stress-strain diagram yet its functional equivalent is obtained by transmitting its load component to a load pacing disk 10 and its strain component to a strain pacing disk 11. The disk 10 actually functions in terms of stress instead of load as will hereafter appear. To initially position the apparatus, these disks are manually rotated by knobs 12 and 13 until disk pins 14 and 15 engage a latch bar 16. When the latch is released the two disks will then rotate respectively in proportion to the specimen load and strain.

*Strain responsive mechanism.*—The strain operating mechanism consists of an extensometer 17 attached to a tension specimen 18. The extensometer has any suitable electrical motion responsive device 19 preferably of the electro-magnetic type shown in Patent No. 2,427,866 in which a pivoted gage point lever axially moves an armature core 20 in proportion to strain of the specimen. The core is surrounded by a primary coil 21 and two secondary coils 22. The motion of device 19 is followed by a similar electro-magnetic motion responsive device 23 whose primary coil is connected in series with coil 21 and supplied with current from a transformer 23' while the secondaries of the two devices are also connected in series and to an electronic strain amplifier 24 whose details are not shown herein as they are well known in the art as is also the case with all other amplifiers referred to herein. As is usual with devices of this type, movement of core 20 causes an unbalanced effect, specifically electrical, with the follower 23. This unbalance feeds into amplifier 24 whose output is connected to a two phase motor 25 for driving a pair of gears 26 and 27 to rotate a threaded shaft 28, Fig. 1, in a fixed nut 29 (a cross section of which is shown for a similar nut at the left side of Fig. 1) and thereby axially move the armature core 30 of follower device 23 to tend to re-establish the electrical balance. As is usual with such devices, the motor 25 continues to rotate so long as increasing strain continues in the specimen. The gear 26 is connected through a friction clutch 31 to a shaft 32 to which disk 11 is suitably fixed and accordingly normally rotates disk 11 in proportion to specimen strain, except when rotation of the disk and shaft is initially prevented by latch bar 16. As shown in Fig. 1, clutch plates 31 are interposed between a gear 90 secured to shaft 32 and gear 26 journaled on the shaft while a spring 31' biases the clutch into frictional contact with the gears.

*Load responsive mechanism.*—The load pacing disk 10 may be driven in any suitable manner by the load indicator of various types of materials testing machines, but for purposes of illustration we have shown a Bourdon tube 33 which diagrammatically may be considered part of a usual materials testing machine such as shown in Patent No. 2,212,085. The free end of the Bourdon tube is connected to any suitable motion-responsive device, preferably to an armature core 34 of an electro-magnetic type device 35 which has primary and secondary coils similar to those of device 19. The primary coil is connected in series with the primary coil of a similar load follower device 36 and is supplied from transformer 23'. The secondary coils of devices 35 and 36 are also connected in series and to an amplifier 37 whose output drives a two phase motor 38 which through a pinion 83' is connected through gears 39 and 40 to axially move the armature core of device 36 to follow up the movement of core 34 upon occurrence of an unbalanced effect, specifically electrical, between the devices. A friction clutch 41, Fig. 1, connects gear 39 to a shaft 42 to which load pacing disk 10 is firmly fixed thereby to normally drive the shaft and disk in proportion to specimen load, except when initially prevented by latch bar 16. As shown in Fig. 1, the gear 39 is journaled on shaft 42 and is axially biased by a spring 41' against clutch plates 41 which in turn frictionally bears against a gear 92 fixed to shaft 42.

*Latch, release—electrical center control.*—The latch bar 16 is lifted, after a predetermined load has been applied to the specimen, to allow the two pacing disks to rotate. To release the latch bar we have provided an amplifier 55, Fig. 7, connected across the two secondaries of the electrical load responsive device 35. The output of amplifier 55 controls a two phase motor 56 whose shaft has an arm 57 for opening or closing a switch 58 depending upon the direction of rotation of motor 56. When switch 58 is closed then a latch solenoid 59 is energized to lift the latch but closing of the switch is deliberately delayed until a predetermined load has been applied to the specimen. This delay is accomplished by having the core 34 of the electro-magnetic device 35 initially set at a position offset from the electrical center of its three coils when the Bourdon tube 33 is not under load. The degree of the electrical offset insures that the apparatus will be in full working order when the latch is released. The release of the latch also determines the starting position of region 7 which will be approached as load on the specimen moves the core 34 to its electrical center. As the electrical center is passed through, the electrical output of device 35 goes toward zero and undergoes phase reversal. As the core 34 continues beyond electrical center the reversed phase voltage fed into latch amplifier 55 serves to reverse the direction of latch motor 56 to allow switch 58 to close, thereby energizing solenoid 59 to release the latch bar. Up to the point of such phase reversal the previously existing phase caused motor 56 to rotate counterclockwise and accordingly keep switch 58 open.

*Offset signal.*—With the latch bar released, the two disks start to rotate and assuming that they rotate equally in the desired 1 to 1 ratio, their successive angular displacements which represent stress and strain could, if desired, be plotted as a diagram whose elastic portion would then correspond to the modulus line 4. As the specimen enters the plastic range 3 the strain disk will rotate faster than the load disk until a contact 75 mounted in the strain disk overtakes and engages a contact 76 mounted in the load disk thereby to close a signal circuit 77 for warning an operator to read the load at that instant or to print or record the load which is the yield strength. These contacts are initially spaced apart a distance 78 representing a selected percentage of offset, say the 0.20 percent as shown in Fig. 9 although this spacing may be varied in accordance with the percent of offset desired. From this it is seen that the latch controlled pins 14 and 15 and contacts 75 and 76 have a pretermined spaced relation to each other when the latch bar 16 is initially lifted. It is essential that this spaced relation be maintained thereafter until the plastic range is entered whereupon the disks will relatively rotate until contacts 75 and 76 engage each other to determine the percent of offset.

Load scale adjustment

In the foregoing operation it was assumed that the physical characteristics of the particular specimen under test and the adjustments of the apparatus were such that for each increment of movement of core 34 in response to a given load change the load pacing disk 10 would be rotated an amount exactly equal to the rotation produced in strain pacing disk 11 by the strain corresponding to that given load. However, if another specimen of either different diameter, or of different material having possibly a different modulus of elasticity, were used without a corresponding adjustment of the apparatus then the load disk 10 would not rotate equally with strain disk 11 and hence the predetermined offset relation between contacts 75 and 76 would be nullified. For instance, if a second specimen were used twice the diameter of the first secimen, the second specimen would require four times as large a load as for the first specimen to produce an equal amount of strain in each. This would mean that the Bourdon tube 33 would move core 34 further than in the case of the first specimen for that given strain and produce a correspondingly greater electrical unbalance between electrical devices 35 and 36. This greater unbalance would cause motor 38 to drive the load disk faster than the strain disk, thereby increasing the distance between the contacts 75 and 76 beyond the predetermined amount of offset 78 between them during the elastic portion of the diagram with the result that when the plastic range would be reached the contacts 75 and 76 would engage each other much later than at the desired 0.20 percent offset.

To maintain the predetermined offset relation for such larger specimen we have provide means for first detecting the presence of any relative rotation between the disks after release of the latch bar, i. e., variations from the predetermined ratio of 1 to 1, and then additional means are provided for adjusting the electrical sensitivity of electrical devices 35 and 36 so as to drive the load disk at a faster or slower rate to restore and maintain the predetermined offset relation of contacts 75 and 76 unless some condition intervenes to prevent such restoration whereupon the test is stopped.

*Ratio responsive means.*—To detect relative rotation between disks 10 and 11, in the event it should occur, there is provided, Fig. 7, a ratio responsive or sensing means including strain pacing and load pacing devices 44 and 45 preferably of the electro-magnetic type similar to the devices 23 and 36, the pacing devices 44 and 45 being driven respectively by the strain and load pacing disk shafts 32 and 42 through the gears 90, 91 and 92, 93. The primary coils of these two pacers are connected in series and supplied from transformer 23' while the secondary coils are also connected in series and to a load scale adjusting amplifier 47. The foregoing electrical connections between the two pacing devices 44 and 45 are such that as long as these devices are driven the same angular distance (which means that the cores will be equally displaced at any given instant) the electrical output of one device will just balance the output of the other device but if one has been driven further then its output will unbalance the output of the other, thereby creating a net signal which is fed into load scale adjusting amplifier 47 to drive a motor 48, Figs. 7 and 8.

*Load scale adjusting means.*—The motor 48 drives a pair of gears 43 and 46 to angularly vary a load scale adjusting potentiometer 49 whose function is to increase the sensitivity, say, of the load responsive electrical device 35 and decrease the sensitivity of the load follower electrical device 36, or vice versa, so that motor 38 will drive the core of load follower 36 faster or slower, as may be required, until at any given instant the total angular displacement of the load pacing disk 10 is exactly the same as the total angular displacement of strain pacing disk 11. The angular position to which the load scale adjusting potentiometer is driven, is, therefore, representative of the ratio of the magnitude of load to strain occurring during the interval 7. In thus adjusting the angular displacement of the load disk, the shaft 42 also axially adjusts the core of the load pacing electrical device 45 to tend to restore the electrical balance with strain pace device 44. When this balance is accomplished the disks 10 and 11 will have moved through the same angular displacement and as long as the balance is maintained the disks will move in synchronism. In this manner the slope of the elastic range of the equivalent stress-strain diagram has been shifted to match the built-in slope of the apparatus. Or viewed in another respect each increment of angular displacement of load disk 10 now represents a load value greater than that for the first specimen. The load scale of disk 10 is therefore changed which, in effect, establishes a constant stress scale for the load pacing disk for test specimens of a given modulus. Such a constant stress scale permits the disk to rotate, during the elastic portion of the specimen, equally with the strain pacing disk which itself has a constant strain scale.

It will be noted that no attempt is made to adjust the rotation of the strain disk for different specimens and therefore the strain provides a fixed basis against which the load scale is adjusted. This allows the stress-strain scale ratio to be fixed and thereby determines the slope of line 4. If a specimen of different modulus is tested, its strain response for a given load will create a new stress scale to which the load scale will be automatically adjusted to conform to the new modulus. The reaction of the device to an increase in modulus of, say 10 percent, is the same as the reaction to an increase in a specimen area of 10 percent. In other words, the apparatus adjusts for an increase in modulus in the same way that it does for an increase in specimen area.

It is necessary to prevent change of the sensitivity of electrical devices 35 and 36 until the latch apparatus 16, 59 is operated. Otherwise the load actuated electrical device 35 might be desensitized to the point where there would not be sufficient signal to operate the latch amplifier 55 and the latch motor 56 and accordingly not operate the latch mechanism. Hence, when the load actuated device 35 produces a signal for operating latch motor 56 to close switch 58 and thus actuate latch solenoid 59 to lift bar 16, it simultaneously closes switch contacts 60 thereby introducing the variable shunting effect of the potentiometer 49, Figs. 7 and 8. Simultaneously another set of contacts 61 is closed to permit operation of potentiometer drive motor 48 which prior to raising of the latch bar 16 must be held inoperative. This is necessary because the potentiometer drive motor 48 would try to operate in the wrong direction as long as the load responsive electrical device 35 is below its electrical center. In driving in the wrong direction any initial unbalance of the electrical devices 44 and 45 is increased rather than decreased and the potentiometer drive motor 48 would operate indefinitely in the wrong direction. Closure of switch 61 will not cause rotation of potentiometer 49 in the wrong direction because at the time of closure of switch 61 the core of load responsive device 35 has again passed through its electrical center thus changing the phase of the signal to the load amplifier 37 to the phase relation required for operation of the two phase servomotors 48 in proper direction.

*Ratio test and check regions 7 and 8.*—The release of the latch occurs at the beginning of region 7, Fig. 9, at which time the circuit to the potentiometer drive motor 48, Fig. 7, includes a brush 65, a pigtail connection 65, and a sector 66 secured to and electrically insulated from the strain pacing disk 11, the sector being suitably connected by a pigtail wire 67 to one side of switch 61. The end of region 7 is represented by the distance from the initial position of brush 65 to a point 68 where an insert of insulation 69 corresponds to the distance between the regions 7 and 8. When the brush 65 engages this insert there is no opportunity whatsoever for the potentiometer 49 to operate but continued rotation of the strain disk will then bring brush 65 into contact with a small portion 70 of the sector to re-establish the circuit for the potentiometer drive motor 48. The sector portion 70 corresponds to the check region 8, Fig. 9, and if the two pacing disks are still operating with equal total angular displacements the cores of electrical elements 44 and 45 will be equally positioned and accordingly no signal will be transmitted to the potentiometer motor 48. Hence, the pacing disk 11 will continue to rotate and brush 65 will ride off of an insulated end of the sector so that no further operation of the potentiometer motor 48 is possible. The test will thus continue into the plastic range 3 of the stress-strain diagram, Fig. 9, at which time the linear relation between stress and strain ceases and accordingly the strain pacing disk will rotate faster than the load pacing disk until contact pin 75 of the strain pacing disk engages corresponding contact pin 76 of the load pacing disk. When these contacts come into engagement they close circuit 77 to produce a signal which indicates that the point of offset intersection 6 between the offset line 5 and the stress-strain diagram 1 has been reached.

If the load and strain pacing disks do not have the same total angular displacements by the time the end of region 7 is reached, thereby causing the distance between contacts 75 and 76 to be different from the desired offset distance 78, it is necessary to discontinue operation of the apparatus at that point. Similarly, when the checking sector 70 is engaged by brush 65 it is also necessary that the offset distance 78 shall be of the required amount. To produce an alarm signal in the event that the rotation of the load pacing disk differs from that of the strain pacing disk the signal delivered by the electrical devices 44 and 45, when unbalanced by relative rotation of the disks, not only causes rotation of motor 48 in its continued effort to establish equal angular displacements of the disks but also energizes a circuit 80 of an alarm signal which advises the operator that the test is not proceeding properly and should be stopped.

*Résumé of Operation*

The load and strain pacing disks 10 and 11, Fig. 7, are indexed to their zero starting position with their stop pins 14 and 15 against latch bar 16 and the test specimen 18 is then loaded to cause the Bourdon tube 33 to move the armature core 34 of load actuated electrical device 35 which establishes an electrical unbalance with load follower electrical device 36 thereby to rotate motor 38 and adjust its armature core until an electrical balance is re-established. Friction clutch 41 allows this balancing operation to take place while disk 10 is held by the latch. The strain of specimen 18 moves core 20 of the electrical device 19 to establish an electrical unbalance with similar electrical device 23 thereby to cause the motor 25 to re-establish an electrical balance by movement of core 30. Friction clutch 31 also permits establishment of this electrical balance while the disk 11 is held by latch 16. When the load has reached a predetermined value the core 34 will have been moved to its electrical center from a point below the same and when this electrical center is passed a signal of reversed phase operates through amplifier 55 to actuate latch motor 56 in a clockwise direction so that its rotor arm 57 allows switch 58 to close, thereby to energize latch solenoid 59 to release pins 14 and 15. As long as the load and strain pacing disks 10 and 11 rotate in unison they define the slope of the elastic range of the specimen but when the strain reaches its plastic range the strain pacing disk 11 moves faster than load disk 10 until electrical contacts 75 and 76 engage each other to initiate a signal thereby indicating that the desired percent of off-set yield has been reached. However, if for various reasons heretofore mentioned the load pacing disk does not rotate in unison with the strain pacing disk after the latch bar is released a differential action will occur between ratio sensing electrical devices 44 and 45 driven respectively in response to strain and load thereby producing an electrical unbalance whose signal operates through the load scale adjusting amplifier 47 to drive the motor 48 which adjusts the potentiometer 49. This potentiometer is so connected into the load actuated and load follower electrical devices 35 and 36 so as to increase the sensivity of one and decrease the sensitivity of the other thereby causing motor 38 to speed up or slow down, as the case may be, until load pacing disk 10 has the same total angular displacement as strain disk 11. When this identical displacement has taken place the ratio sensing electrical devices 44 and 45 will again be in electrical balance with each other. When these disks are initially zeroed by latch bar 16, the cores of electrical devices 44 and 45 are equally displaced from their electrical centers with the result that no electrical unbalance is then present between these two devices. Hence, assuming that the devices 10 and 11 have been restored to a uniform angular displacement, this uniformity will continue until the strain reaches the plastic range at which time the disk 11 will then rotate faster than disk 10 until electrical contacts 75 and 76 engage each other to given an indication that the offset yield point has been reached.

The ratio sensing devices 44 and 45 are in balance but are not operative until the latch bar is released at which time switch 61 is closed whereupon circuit is established through brush 65 and sector 66 to allow the potentiometer drive motor 48 to operate in response to any electrical unbalance between the devices 44 and 45. If there is any unbalance it may be brought into balance up to the point where brush 65 rides on to an insulated portion 69. Assuming that a balance has been established at least by the time this point has been reached it is then desired at a later point in the elastic range to check the stress-strain ratio to see that it has been maintained. This occurs when brush 65 passes off of insulating portion 69 on to a check sector 70 thereby re-establishing the circuit for the potentiometer drive motor 48. If the initial ratio is confirmed by sector 70 the test can proced, but if an unbalance exists between the ratio sensing devices 44 and 45 when the brush passes on to the insulated sector 69 or passes off of the check sector 70 a signal is produced in circuit 80 to warn the operator to discontinue the test.

During the initial loading of the specimen, when the disks 10 and 11 are being held against rotation, any electrical unbalance which may exist between the electrical devices 35 and 36 may be brought into balance through operation of motor 38 thereby allowing the core of load follower 36 to move to its electrical center at the latch release point. The motor 38 can operate even while pacing disk 10 is held in its latched position because friction clutch 41 permits necessary slippage during rotation of gear 39. This balancing operation permits any subsequent load scale adjustment of load disk 10 to start with the load follower 36 in balanced relation to device 35. This balance occurs when the devices 35 and 36 are at their electrical centers, this being the instant the latch is released. If the load follower were unable to move simultaneously with that of electrical device 35 during this preliminary period then upon lifting of latch 16 the load pacing disk 10 would have an erroneous angular movement imparted to it by the action of the load follower 36 to move ahead to catch up with and follow core 34. Thus, the pacing disks are mutually indexed at zero and the electrical devices 35, 36, 44 and 45 are at their electrical centers and in balance at the latch release point. Since the signal from these electrical devices is effectively zero at electrical center, any change of the load follower 36 in response to the presence of any deviation from the desired stress-strain ratio is accomplished without shifting the relative positions the disks 10 and 11 would have if the load were returned to the latch operating value.

It is also seen that the ratio sensing circuit, including load pacing and strain pacing electrical devices 44 and 45, and the load scale adjusting circuit including potentiometer 49 and its drive motor 48 should be frozen before the plastic range of the specimen is reached. It is also essential that these circuits should not be energized while the load actuated and load following electrical devices 35 and 36 are below their electrical center. Otherwise the load scale adjusting circuit would operate needlessly and in the wrong direction. For this reason the load scale adjusting circuit is not operative until switch 61 is closed by release of the latch and then the circuit continues operative until the strain disk 11 has rotated an amount well within the elastic range. This disengagement of brush 65 with sector 66 and check sector 70 effects freezing of the load scale adjusting circuit and if the potentiometer 49 is still being driven by motor 48 in response to unbalance of pacers 44 and 45 at these instants of disengagement an alarm signal is derived from circuit 80 which advises the operator that the test has not progressed properly. These precautions are necessary as the correct selection of the load scale for disk 10 might be interfered with by poor loading of the test specimen whereby a straight curve in the elastic region is not obtained, or by faulty operation of the extensometer, or by fast loading which does not give the apparatus time to adjust to the correct stress-strain ratio before the freeze point is reached.

Thus, it is seen the load pacing element 10 with its actuating connections 35, 36 and 38, and the strain pacing element 11 with its actuating connections 19, 23 and 25, respectively constitute, broadly, load responsive means and strain responsive means. The strain pacing disk 11 responds in a fixed manner to strain in the test specimen after the latch 16 has disengaged pin 14. Its angular rotation is in fixed proportion to strain and it may, therefore, be considered as having a fixed strain scale on its circumference.

The action of the pacing elements 44 and 45 and the load scale adjusting potentiometer 49 together with its drive motor 48 and amplifier 47 is to adjust the rate of response of disk 10 to the load signal from the Bourdon tube 33 and device 35 so that the disk 10 moves in unison with disk 11, as explained heretofore, throughout the proportional or elastic region of the stress-strain curve. Since stress and strain are proportional in this region of the curve and since they are related by the modulus of elasticity "E" in the expression E=stress/strain, and since the disk 11 rotates in fixed proportion to strain it follows that disk 10 rotates in fixed proportion to stress and can be considered as having a fixed stress scale on its circumference for all test specimens of a given modulus of elasticity. A change in modulus would, in effect, change the value of the stress scale on disk 10 by the same proportion.

It should be pointed out that one difficulty heretofore encountered with range-adjusting mechanisms in general has been that in the process of changing the range so that the indication conformed to a desired value, the zero or starting position indication also shifted. It was necessary to recheck the zero position and then make a further correction of the range to compensate for shift of the zero brought about by the previous change of range. This process involved multiple checks of zero points and subsequent range shifts until the desired precision of range adjustment was attained. Obviously this is utterly impractical in apparatus of our type. Our apparatus, which uses electrical center of the transformer bridge as the zero or starting position (latch position) does not experience a shift of this point when its range (or span) is shifted, and hence when we make the range of the load dial correspond to the range of the strain dial at any point other than zero, as we do in the region 7, then it will correspond at any point above or below 7 as long as the elastic behaviour of the test specimen continues. The reason the zero or starting position does not shift with changes of range is that at this position the output of each electrical motion responsive device in the transformer bridge is zero voltage and no amount of shunting of either the pick-up electrical device 35 or the balancing electrical device 36 will alter their balance positions at this point. As the pick-up moves away from electrical center the range (or span) of the balancing device is, of course, affected by the shunting potentiometer.

The system we use, employing the latch mechanism, of identifying electrical center electrically during each test is positive and precise. It is not affected by slight changes in the electrical center of the electrical device with respect to zero load on the Bourdon tube as could be expected from small mechanical shifts in the apparatus due to temperature or mechanical strain.

The system we use (the entire latch mechanism) is equally adaptable to span adjustment problems of any type of electrical bridge such as bonded wire type strain gage bridges or inductance bridges.

To provide a safety limit for the rotation of the pacing disks 10 and 11 we have provided, Figs. 1 and 11, a lateral pin 81 in the driven gear 26 which is connected to strain pacing disk 11 and a radial pin 82 in the hub of an idler gear 84 which is journalled on a stationary shaft 85. As shown in Fig. 11 the end of radial pin 82 will abut against the lateral pin 81 at a given angular position in their relative rotations and at a point where the lines of arcuate movement of these pins intersect, thus causing the pins to tend to move toward each other even after they are engaged. Similar pins 86 and 87 are also provided for gears 39 and 88 on the load responsive side of the apparatus, the latter gear being journalled on shaft 85. The gears 84 and 88 can make several revolutions before the stop pins engage each other.

To adjust the length of the ratio test section 7, Fig. 9, the sector brush 65, Fig. 1, is mounted upon a disk 94 of insulation which is secured to a gear 95 and these two elements are journaled upon shaft 32. Normally these elements are held in a non-rotatable position by having gear 95 mesh with a small pinion 96 which is journaled upon the stationary shaft 85 between two hubs 97 and 98 secured to shaft 85. A spring finger type friction clutch 99 is secured to hub 97 to frictionally hold pinion 96 in any position to which the disk and gear 94, 95 may be manually angularly adjusted by merely directly grasping these elements and rotating them. By rotating these elements the brush 65 may be advanced or retarded in its position with respect to the end 68 of sector 66, Fig. 7, and accordingly cause the brush to move onto insulated segment 69 sooner or later, as may be desired. This is the same as lengthening or shortening the upper end of the test region 7, Fig. 9.

Throughout the description herein, it has been stated for purposes of simplicity in connection with the diagram of Fig. 7 that the pins 15 and 16 are initially positioned by being rotated against latch bar 16. However, it is seen in Fig. 7 that after the latch bar is lifted to start the test section 7 the pins 14 and 15 rotate clockwise beneath the raised latch. To then reset the load and pacing disks 10 and 11, they are rotated counterclockwise by knobs 12 and 13. To permit the pins 14 and 15 to pass back under the latch it is formed on an arm pivoted at a stationary point 102, Fig. 4, and the bottom edge of the latch 16 is suitably beveled to permit the pins to lift it during reverse manual rotation. The pins are then set at zero by engaging a stationary stop 103. Of course, when the apparatus is started, the disks 10 and 11 are constantly biased against the latch bar 16 until it is lifted and therefore, broadly speaking, the zero position of pins 14 and 15 is initially set by the latch bar.

While our invention involves response to factors proportional to stress and strain yet, in the broader aspects of our invention, these factors represent changing conditions which have an initial linear relation and a subsequent departure therefrom. Our apparatus automatically establishes the linear relation of one of these changing conditions to the other and also produces an indication automatically upon occurrence of a predetermined departure from the linear relation.

From the foregoing disclosure it is seen that we have provided an apparatus that is highly effective in accurately determining offset yield strength.

It will, of course, be understood that the disclosure herein is only one specific embodiment that the invention might take and that various changes in construction and arrangement of parts may be made by those skilled in the art without departing from the spirit of the invention as set forth in the appended claims.

We claim:

1. Apparatus for determining an offset yield strength of a specimen of material loaded through its elastic range, which is linear, into its plastic range, which is non-linear, comprising, in combination, load responsive means, strain responsive means, means jointly controlled by said load and strain responsive means so as to respond to the ratio of the magnitude of specimen strain to the magnitude of specimen load during an interval in the elastic range, and means responsive to a predetermined departure in the response of said load and strain means from said ratio existing during said interval in the elastic range so as to produce an indication upon occurrence of said predetermined departure thereby to define the offset yield strength.

2. The combination set forth in claim 1 further characterized by means for establishing said ratio so that it is of a predetermined value within an initial portion of the elastic range and for subsequently checking said ratio in another portion of the elastic range to determine whether the predetermined value of the ratio has been maintained.

3. Apparatus for determining an offset yield strength of a specimen of material loaded through its elastic range, which is linear, into its plastic range, which is non-linear, comprising, in combination, load responsive means, strain responsive means, movable means jointly controlled by said load and strain responsive means so as to be movable to a position in accordance with the ratio of the magnitude of specimen strain to the magnitude of specimen load during an interval in the elastic range, and means also controlled by said load and strain responsive means to give an indication upon occurrence of a predetermined departure in the response of said load and strain means from said ratio existing in said interval thereby to define the offset yield strength.

4. Apparatus for determining an offset yield point of a specimen of material loaded through its elastic range into its plastic range comprising, in combination, load responsive means, strain responsive means, means for establishing during the elastic range a predetermined effect between the load and strain responses of said two means, means controlled by said load and strain responsive means for indicating when a predetermined change in said effect occurs in the plastic range thereby to define the offset yield point, electrically controlled zeroing means for establishing a zero position of the load and strain responsive means, the load responsive means including a load actuated electrical motion responsive device having an electrical center and being provided with a movable element and a similar electrical motion responsive device also having a movable element for following the movement of the other movable element whereby when said elements have predetermined relative positions an electrical balance is established between said devices, the movable element of the load actuated device being initially disposed to one side of the electrical center thereof so that an initial load has to be imposed upon the specimen to move the movable element of the load actuated electrical device to its electrical center to establish an electrical balance between the two devices, and means controlled by said electrical devices for releasing said zeroing mechanism as said electrical center is passed thereby to define the beginning of the portion of the elastic range in which the predetermined effect between the load and strain responses is to be established.

5. Apparatus for determining an offset yield point of a specimen of material loaded through its elastic range into its plastic range comprising, in combination, load responsive means, strain responsive means, means for establishing during the elastic range a predetermined effect between the load and strain responses of said two means, means controlled by said load and strain responsive means for indicating when a predetermined change in said effect occurs in the plastic range thereby to define the offset yield point, said load responsive means including a load actuated electrical motion responsive device and a follow-up electrical motion responsive device electrically coupled together whereby when said devices have predetermined relative positions in their motions an electrical balance is established between them, means for establishing a zero position of the load and strain responsive means, means for allowing said follow-up device to follow the motions of the load actuated electrical device while the zero position of the load and strain responsive means is maintained thereby to effect an electrical balance between said electrical devices before said zero position is released, and means for releasing the zero positioning means automatically upon occurrence of a predetermined position of the load actuated electrical motion responsive device whereby said release occurs simultaneously with the load actuated and load follower electrical devices being in balanced relation.

6. Apparatus for determining offset yield strength of a specimen of material loaded through its elastic range into its plastic range comprising, in combination, means movable in response to the strain of the specimen, means movable in response to the load applied to the specimen to produce said strain, means controlled by the load and strain responsive means for automatically establishing during the elastic range of the specimen a predetermined ratio of movement between said strain and load responsive means, and means controlled by said load and strain responsive means for indicating when a predetermined departure from said ratio of movement occurs in the plastic range of the specimen thereby to define the offset yield strength.

7. Apparatus for determining offset yield strength of a specimen of material loaded through its elastic range into its plastic range comprising, in combination, load responsive means, strain responsive means, means responsive to variations from a predetermined ratio of load response to strain response, adjusting means controlled by said ratio responsive means for relatively adjusting the load and strain responsive means so as to establish said predetermined ratio during the elastic range, and means controlled by said load and strain responsive means for indicating when a predetermined departure from said ratio occurs in the plastic range thereby to define the offset yield strength.

8. The combination set forth in claim 7 further characterized by means controlled by the strain responsive means for rendering the adjusting means inoperative until a predetermined initial portion of the elastic range has passed.

9. Apparatus for determining offset yield strength of a specimen of material loaded through its elastic range into its plastic range comprising, in combination, load responsive means, strain responsive means, means responsive to variations from a predetermined ratio of load response to strain response, means controlled by said ratio responsive means for establishing said predetermined ratio during the elastic range, and means controlled by said load and strain responsive means for indicating when a predetermined departure from said ratio occurs in the plastic range thereby to define the offset yield strength.

10. The combination set forth in claim 9 further characterized by means cooperating with the strain responsive means for giving a signal if the variations from said predetermined ratio continue beyond a certain point in the elastic range.

11. The combination set forth in claim 9 further characterized by means for rendering the means controlled by the ratio responsive means inoperative until a predetermined initial portion of the elastic range has passed.

12. Apparatus for determining offset yield strength of a specimen of material loaded through its elastic range into its plastic range comprising, in combination, load pacing and strain pacing movable elements, power means for moving the load pacing element, a load actuated electrical motion responsive device and a similar follower device electrically coupled thereto for controlling the power means for moving the load pacing element, power means for moving the strain pacing element, strain controlled electrical motion responsive means for controlling the power means for moving the strain pacing element, means responsive to variations from a predetermined ratio of movement between said pacing elements during the elastic range, means controlled by said ratio responsive means for varying the electrical balance of the electrically coupled devices so as to effect movement of the load pacing element to establish said predetermined ratio during said elastic range, and means controlled by the pacing elements for initiating a signal at a predetermined point in the plastic range by movement of the strain pacing element at a rate faster than that of the load pacing element thereby to determine the offset yield strength.

13. The combination set forth in claim 12 further characterized in that the offset signal means includes electrical contacts respectively connected to the load and strain pacing elements and disposed in the path of each other so as to come into engagement when the strain pacing element moves a greater distance than the load pacing element during the plastic range, whereby the initial spacing between said contacts determines the percent of offset yield strength.

14. Apparatus for determining offset yield strength of a specimen of material loaded through its elastic range into its plastic range, comprising, in combination, movable elements responsive respectively to load and strain, means for impositively moving the load responsive element including a load actuated electrical motion responsive device and a similar follow-up device electrically coupled thereto, means for impositively moving the strain responsive element including a strain actuated electrical motion responsive device and a similar follow-up device electrically coupled thereto, zeroing means for maintaining said load and strain responsive elements in a zero position during an initial portion of the elastic range, and means for allowing said load and strain electrical motion responsive and follow-up devices to respond respectively to load and strain changes during said initial portion of the elastic range while the load and strain responsive elements are maintained in their zero position, and means for releasing said zeroing means automatically upon occurrence of a predetermined position of the load actuated electrical motion responsive device.

15. Apparatus for determining offset yield strength of a specimen of material loaded through its elastic range into its plastic range comprising, in combination, movable elements responsive respectively to load and strain, means for impositively moving the load responsive element including a load actuated electrical motion responsive device and a similar follow-up device electrically coupled thereto, means for impositively moving the strain responsive element including a strain actuated electrical motion responsive device and a similar follow-up device electrically coupled thereto, zeroing means for maintaining said load and strain responsive elements in a zero position during an initial portion of the elastic range, means for allowing said load and strain electrical motion responsive and follow-up devices to respond to load and strain changes during said initial portion of the elastic range while the load and strain responsive elements are maintained in their zero position, electrically coupled load and strain pacing electrical motion responsive devices respectively connected to said load and strain responsive elements so as to follow the movements thereof, said coupled load and strain pacing electrical devices being electrically balanced during said zero position of the load and strain responsive elements, means for releasing the zero positioning means when the load and strain responsive elements are in their zero position at which time all of the electrically coupled motion responsive devices are in electrically balanced relation to each other, a potentiometer for changing the relative sensitivities of said load actuated electrical device and its follow-up electrical device upon occurrence of any relative movement between the load and strain responsive elements after they are released, whereby during continued loading through a post-initial portion of the elastic range the predetermined relation the load and strain responsive elements had to each other in their zero position may be restored, means for adjusting said potentiometer in response to electrical unbalance created between the electrically coupled load and strain pacing electrical motion responsive devices upon occurrence of relative movement between the load and strain responsive elements during the elastic range thereby to restore said predetermined relation between the load and strain responsive elements, and means for producing a signal when a predetermined relative movement occurs between said load and strain responsive elements during the plastic range.

16. Apparatus responsive to a plurality of changing conditions which have a linear relation during a given interval and a subsequent departure therefrom comprising, in combination, a plurality of means respectively movable in response to the separate conditions, means controlled by said plurality of responsive means so as to respond to the ratio of the magnitude of said conditions to each other during said interval in the linear relation, and means for producing an indication upon a later occurrence of a departure of predetermined magnitude of one condition from said ratio.

17. Apparatus for translating a changing condition to an element comprising, in combination, an electrical motion responsive device having an electrical center and a condition responsive member movable from one side of the center to the other side thereof in response to changes in the condition and said condition responsive member being initially disposed on one side of the center, a similar electrical motion responsive device electrically coupled to said device and having a member movable so as to keep the devices in electrical balance upon movement of the condition responsive member, a movable element, means controlled by the electrical unbalance of said devices for impositively moving said movable element in response to a change of the condition, means for restraining movement of said movable element even while said electrical devices are being responsive to a change in condition, and means controlled by said electrically coupled devices for releasing said restraining means when said condition responsive member passes through the electrical center of its electrical device.

18. The combination set forth in claim 17 further characterized in that the electrically coupled devices have primary coils connected in series and secondary coils also connected in series whereby the phase of a signal of each of the said devices changes when the electrical center is passed, and the means for releasing the restraining means is operated by the change in phase.

19. The combination set forth in claim 17 further characterized in that the electrically coupled devices have primary coils connected in series and secondary coils also connected in series whereby the phase of a signal from either of said devices changes when the electrical center is passed, and the means for releasing the restraining means includes a two phase motor that is biased in one direction by the phase on one side of the electrical center thereby to maintain the restraining means in its restraining position and is biased in the opposite direction by the other phase when the electrical center is passed thereby to release the restraining action.

20. The combination set forth in claim 17 further characterized in that the electrical devices have primary coils connected in series and secondary coils also connected in series whereby the phase of a signal from either of said devices changes when the electrical center is passed, while the restraining means includes an electro-magnetic device having a power source and switching means for controlling the source so as to energize or de-energize the electro-magnetic device to effect the restraining action or release of the same, and means are provided including a two phase motor that is biased in one direction by the phase on one side of the electrical center to operate the switching means in one direction to maintain the restraining means in its restraining position and is biased in the opposite direction by the other phase when the electrical center is passed to operate the switching means in the other direction to release the restraining action.

21. Apparatus for determining offset yield strength of a specimen of material loaded through its linear elastic range into its plastic range comprising, in combination, load pacing and strain pacing movable elements, means controlled by strain changes for driving said strain pacing element so that it moves the same distance at all times for a given amount of strain change, means controlled by load changes for driving said load pacing element in response to load, means for adjusting said load controlled means so that the load pacing element moves the same distance at all times for different specimens respectively requiring different loads to produce said given strain, whereby movement of the load pacing element represents the value of stress converted from load for producing said given strain, and means controlled by relative movement between said pacing elements for initiating a signal when a predetermined variation occurs from the linear stress-strain relation of the elastic range thereby to define the offset yield strength of a specimen.

22. Apparatus for determining offset yield strength of a specimen of material loaded through its linear elastic range into its plastic range comprising, in combination, load responsive means, strain responsive means, load scale adjusting means for controlling said load responsive means so that its response is the same for different loads required to produce the same amount of strain in different specimens whereby the response to said different loads represents different scale values of stress, and means controlled by relative movement between said load and strain responsive means for initiating a signal when a predetermined variation occurs from the linear stress-strain relation of the elastic range thereby to define the offset yield strength of a specimen.

23. Apparatus for determining offset yield strength of a specimen of material loaded through its linear elastic range into its plastic range comprising, in combination, load responsive means, strain responsive means, means for establishing a single predetermined relation between the load and strain responses for different specimens requiring different loads to produce the same amount of strain in each whereby the response to said different loads represents different scale values of stress, and means controlled by said load and strain responsive means for initiating a signal when a predetermined variation occurs from the linear stress-strain relation of the elastic range thereby to define the offset yield strength of a specimen.

24. The combination set forth in claim 1 further characterized by the provision of means for delaying the action of the ratio responsive means for a short period during initial loading of a specimen, thereby to control the starting point of the interval in the elastic range so as to eliminate any preliminary variations from a linear line that may occur during the initial loading.

25. Apparatus for determining the offset yield point of a specimen of material loaded through its elastic range, which is linear, into its plastic range, which is non-linear, comprising, in combination, load responsive means, strain responsive means, an angularly movable member, means for effecting angular positioning of said member by said load and strain responsive means so that the member assumes a position corresponding to the ratio of load to strain response during an interval of the elastic range, and means for giving an indication when the load and strain response varies a predetermined amount from the ratio established by the position of the angularly movable member during the elastic range thereby to establish the offset point.

References Cited in the file of this patent

UNITED STATES PATENTS

| | | |
|---|---|---|
| 923,511 | Greenbaum | June 1, 1909 |
| 1,162,475 | Gibson | Nov. 30, 1915 |
| 1,327,393 | Jury | Jan. 6, 1920 |
| 2,014,357 | Klemperer | Sept. 10, 1935 |
| 2,212,085 | Tate | Aug. 20, 1940 |
| 2,538,824 | Anderson | Jan. 23, 1951 |
| 2,587,653 | Ruze | Mar. 4, 1952 |
| 2,612,774 | Zener | Oct. 7, 1952 |
| 2,651,196 | Pinkel | Sept. 8, 1953 |
| 2,662,396 | Hunter | Dec. 15, 1953 |
| 2,664,907 | Lowe | Jan. 5, 1954 |

Disclaimer 2,775,886.—*Robert P. Lathrop*, Chevy Chase, Md., and *Lawrence K. Hyde*, Washington, D.C. OFFSET YIELD STRENGTH TESTING APPARATUS. Patent dated Jan. 1, 1957. Disclaimer filed May 22, 1964, by the assignee, *Baldwin-Lima-Hamilton Corporation*.

Hereby enters this disclaimer to claims 22 and 23 of said patent.

[*Official Gazette August 18, 1964.*]